United States Patent [19]
King

[11] Patent Number: 5,429,215
[45] Date of Patent: Jul. 4, 1995

[54] QUICK CHANGE BRAKE SHOE WITH REMOVABLE BRAKE SHOE PADS

[76] Inventor: E. Autry King, Rte. 12, Box 770, Cullman, Ala. 35055

[21] Appl. No.: 105,626

[22] Filed: Aug. 13, 1993

[51] Int. Cl.⁶ .......................................... F16D 64/00
[52] U.S. Cl. .................. 188/250 C; 188/250 G; 188/250 B; 188/242
[58] Field of Search ................ 188/74, 78, 325, 327, 188/328, 242, 247, 248, 250 B, 250 G, 250 R, 250 A, 250 C, 250 D, 250 E; 192/107 T

[56] References Cited

U.S. PATENT DOCUMENTS

| | | | |
|---|---|---|---|
| 1,671,728 | 5/1928 | Brie | 188/250 C |
| 1,719,211 | 7/1929 | Burton | 188/250 D |
| 1,874,863 | 8/1932 | Bendix | 188/250 C |
| 1,934,448 | 11/1933 | Roth | 188/234 |
| 2,128,467 | 8/1938 | Merritt | 188/242 |
| 2,361,307 | 10/1944 | Merritt | 188/234 |
| 2,948,360 | 8/1960 | Lupton | 188/234 |
| 3,066,766 | 12/1962 | Minor et al. | 188/78 |
| 3,398,814 | 8/1968 | Deibel | 188/78 |
| 3,467,229 | 9/1969 | Deibel | 188/245 |
| 3,650,360 | 3/1972 | King et al. | 188/250 C X |
| 3,894,620 | 7/1975 | Goldberg | 192/75 |
| 3,941,222 | 3/1976 | Newstead | 188/250 G |
| 4,771,870 | 9/1988 | Belk | 188/250 D |
| 4,823,921 | 4/1989 | Bosco | 188/250 G |
| 4,867,285 | 9/1989 | Gatlin | 188/250 D |
| 4,867,295 | 9/1989 | Metcalf et al. | 192/141 |
| 4,936,426 | 6/1990 | Chatman et al. | 188/330 |
| 5,119,909 | 6/1992 | Shim | 188/245 |

FOREIGN PATENT DOCUMENTS

| | | |
|---|---|---|
| 0331532 | 9/1989 | European Pat. Off. . |
| 757380 | 12/1933 | France . |
| 760231 | 2/1934 | France . |
| 2003074 | 11/1969 | France . |
| 2446962 | 6/1989 | France . |
| 3338236 | 9/1984 | Germany . |
| 8806286 | 8/1988 | Germany . |
| 788320 | 12/1957 | United Kingdom . |
| 898646 | 6/1962 | United Kingdom . |
| 1264114 | 2/1972 | United Kingdom . |

*Primary Examiner*—Robert J. Oberleitner
*Assistant Examiner*—Lee W. Young
*Attorney, Agent, or Firm*—Foley & Lardner

[57] ABSTRACT

A brake shoe assembly with a removable brake shoe pad. A brake shoe assembly includes a brake shoe plate. A brake shoe pad and a pair of connector plates are provided. The brake shoe pad is adjustably received on the bottom of the brake shoe plate. The connector plates are slidably positioned onto the top of the brake shoe plate, and are connected to the brake shoe pad through the brake shoe plate by rivets through corresponding openings formed therein. The connector plates are additionally connected to the brake shoe plate by vertical members, with screws inserted through corresponding openings formed therein.

22 Claims, 2 Drawing Sheets

QUICK CHANGE BRAKE SHOE WITH REMOVABLE BRAKE SHOE PADS

BACKGROUND OF THE INVENTION

1. Field of the Invention

The invention relates to a brake shoe, and, more particularly, to a brake shoe assembly with a brake shoe pad which is rapidly and easily removed and replaced.

Through normal use, a brake shoe pad may become worn, affecting the braking of a vehicle and requiring replacement. A traditional brake shoe pad for brake shoes typically is a relatively permanent attachment to the brake shoes. Such traditional brake shoe pads are not easily replaced.

Nevertheless, ease and speed of replacement is generally desirable, in that this tends to reduce the time required for brake maintenance or scheduled vehicle maintenance. Moreover, in some situations, it may be desirable to rapidly replace the brake shoe pads without delaying for scheduled maintenance.

2. Discussion of the Related Art

If faced with replacement of a conventional brake shoe assembly, commercial drivers are confronted with several hours of downtime and greater expenses in parts and labor. Also, food and lodging must be taken into consideration during downtime. Moreover, if the driver is checked at Department of Transportation check points and found to be running with insufficient brake shoe pads, substantial fines are levied against him. A driver cannot continue with trip until replacement brake shoes are installed which takes hours. Downtime for brake shoe assembly repair costs money and expenses.

Many accidents and injuries are caused by not replacing brake shoes when actually needed. Moreover, brake systems occasionally malfunction or lock-up, burning off the brake pads. Several hours of downtime are needed to replace conventional brake shoes. Due to loss of revenue and downtime, many companies and drivers will take the risk of making additional trips before stopping to replace conventional brakes. These actions create hazards on roadways which contribute to highway deaths and accidents.

Additionally, in conventional brake assembly replacement, replacement parts and supplies are needed, for example, seals, axle oil/dope and grease. During replacement, seals are broken releasing axle oils and greases. Grease and oil containers, along with seals and other parts should be disposed of properly. However, this continues to add to land fills, which are already limited in size and capacity. If not handled and disposed of properly, these further contaminate and pollute lakes, rivers, streams and the soil.

One example of a brake shoe mounting assembly is disclosed in U.S. Pat. No. 4,867,285. An arcuate brake shoe confronting a brake drum assembly or an actuator or web assembly is mounted in the housing and engageable with the brake shoe. A slotted beam assembly is attached to either the actuator or the brake shoe, and the insertion assembly is attached to the other. The insertion assembly is fastened within the slotted assembly to lock together the actuator and brake shoe. The slotted and insertion assemblies are released to enable selected removal of the brake shoe from or insertion of the brake shoe into the housing.

One example of a truck brake is disclosed in U.S. Pat. No. 3,398,814. Bolts on the inside of the wheel in alignment with the axle can be removed to free the shoe and its worn lining from the shoe carrier. The lower shoe is removed by a straight axial pole. The upper shoe is unbolted, then turned peripherally to the bottom of the wheel, and similarly removed by a straight axial pole. Hence, the wheels need not be removed for the brakes to receive new linings.

Another example of a brake shoe with replaceable parts is disclosed in U.S. Pat. No. 2,948,360, which shoes a brake shoe including a rim and a web which can be replaced in the field. Additionally, U.S. Pat. Nos. 4,823,921, 4,771,870, 3,467,229 and 3,066,766 disclose brake shoe assemblies with liners which may be removed and/or changed. U.S. Pat. Nos. 4,936,426, 3,941,222, 3,894,620, French Patent 2,003,074 and British Patent 1,264,114 disclose brake shoes with vertical members.

These references teach use of certain elements for various purposes. For example, U.S Pat. No. 4,823,921 teaches the use of rivets to connect brake shoe assemblies. Similarly U.S. Pat. No. 4,867,295 discloses a brake pad with a brake support section including flanges and alignable channel portions. Unfortunately, the brake shoe pads provided thereby have the disadvantage that they are not quickly and easily replaced.

Additionally, some of these brake shoe pads may become loosened during use. Moreover, these brake shoe pads may not be as sturdy as necessary for certain applications.

Thus, there remains a need for an improved brake shoe with a brake shoe pad which can be easily and rapidly replaced. Also, there remains a need for a system which helps the driver to avoid fines and penalties for insufficient brake shoes.

Further, there is a need for a brake shoe system which contributes to a safer, faster and more economical way of moving products on our roadways, along with helping to preserve our resources and protect our environment.

SUMMARY OF THE INVENTION

An object of the invention is to provide a brake shoe, in which the brake shoe pad is quickly and easily replaced.

Another object of the invention is to provide a brake shoe with removable brake shoe pad, which is sturdy.

Yet another object of the invention is to provide a brake shoe with removable brake shoe pad which is less likely to become loosened during use.

An advantage of the invention is that, if the brake systems lock-up causing the brake pads to burn off, the driver could replace his own brake pads himself with only one wrench, thus putting his vehicle back into a road worthy condition virtually immediately.

A further advantage of the invention is that fewer replacement parts and supplies are required. Thus it is more environmentally friendly.

The brake shoe assembly of the invention includes a brake shoe plate, with a plurality of shoe openings formed therein, and a vertical plate member, with a plurality of plate apertures formed therein. Also included is a brake shoe pad, with a plurality of pad openings formed therein corresponding to the shoe openings. There is at least one connector plate, with a plurality of connector plate openings formed therein corresponding to the shoe openings, and a vertical connector member, with a plurality of connector apertures formed therein corresponding to the plate apertures. There is a plurality of first connectors, each received in the corresponding shoe opening, pad opening, and connector plate opening. Also, there is a plurality of second connectors, each received in the corresponding plate apertures and connector aperture.

According to another aspect of the invention, a brake shoe plate with bottom and top lips is attached to a brake. A brake shoe pad is slidably inserted onto the bottom of the brake shoe plate using the bottom lips. Two connector plates are slidably positioned onto the top of the brake shoe plate using the top lips, one connector plate being located on each side of the brake shoe plate. The connector plates are connected to the brake shoe pad through the brake shoe plate. The connector plates are connected to the brake shoe plate.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

An exemplary embodiment of the invention is illustrated in the drawings and described in detail below.

In the drawings.

DETAILED DESCRIPTION OF THE PREFERRED EMBODIMENTS

Figure 10:
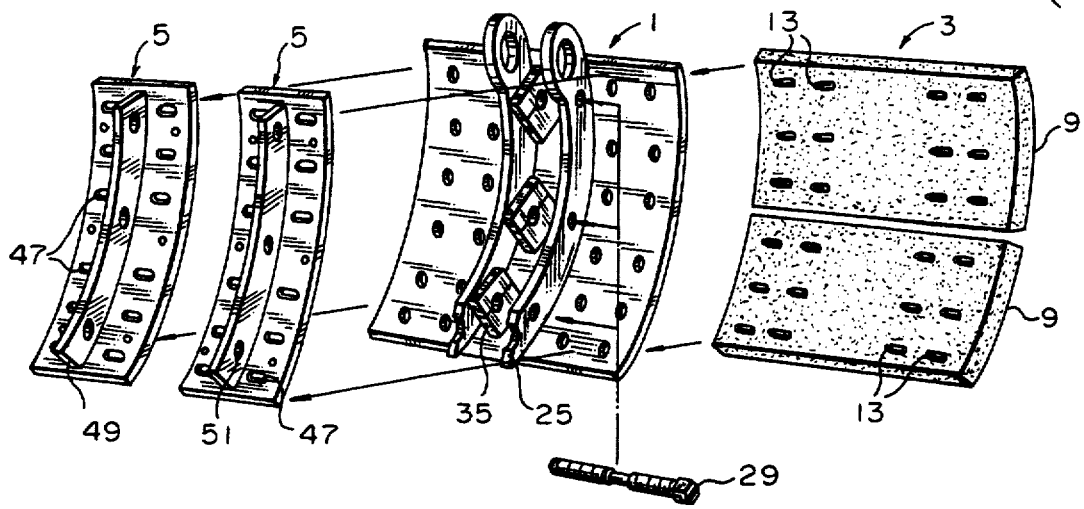
FIG. 10 is an exploded perspective view of the brake shoe assembly.

An exemplary embodiment of a brake shoe assembly with an easily replaceable brake shoe pad is illustrated and herein described. The general structure of the exemplary embodiment is illustrated in FIG. 10. The brake shoe assembly generally includes a brake shoe plate 1, a brake shoe pad 3 which is connected to the brake shoe plate 1, and a pair of connector plates 5 which are connected to the brake shoe plate 1.

Figure 1:
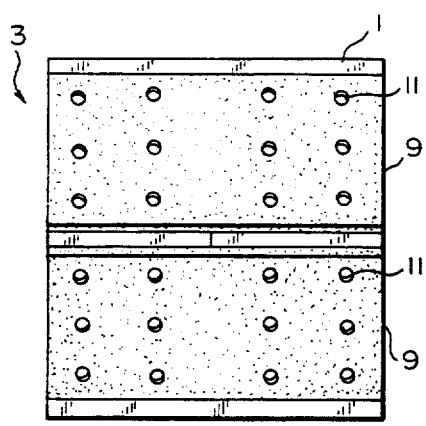
FIG. 1 is a bottom view of a brake shoe pad on a brake shoe plate.
Figure 3:
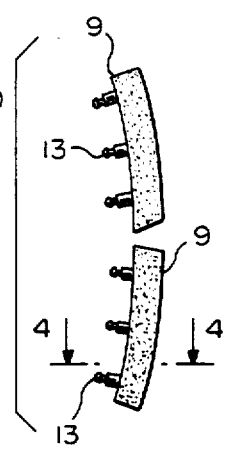
FIG. 3 is a side view of the brake shoe pad.

The brake shoe pad 3 is illustrated in FIGS. 1 and 3. As shown in FIG. 1, one embodiment of the brake shoe pad 3 advantageously includes a pair of contact pads 9. The contact pads 9 are made of a material suitable for use in braking a wheel of a vehicle. Such materials are well known and the contact pads are commercially available. Industry standards currently require dual contact pads, to achieve longer wear and better cooling. The contact pads 9 together provide a unitary brake shoe pad 3, which is removed and/or replaced from the brake shoe assembly.

The brake shoe pad 3 includes connection receptors for receiving a plurality of first connectors, which connect the brake shoe pad 3 to the brake shoe plate 1. In the illustrated embodiment, the connection receptors of the brake shoe pad 3 are advantageously a plurality of pad openings 11 formed in the brake shoe pad 3. The pad openings 11 are formed in the contact pad 9.

The first connectors, which are used to connect the brake shoe pad 3 to the brake shoe plate 1, enable the brake shoe pad 3 to be quickly and easily removed and inserted on the brake shoe plate 1. Moreover, the first connectors provide a sturdy connection between the brake shoe plate 1 and the brake shoe pad 3.

Figure 4:
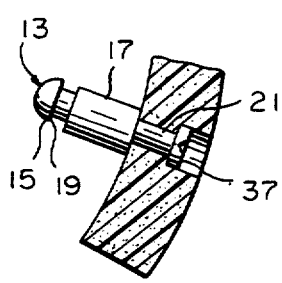
FIG. 4 is a side view in detail of the brake shoe pad taken from FIG. 3.
Figure 14:
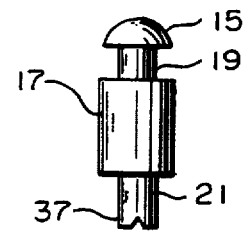
FIG. 14 is an elevation of the connector.

Thus, as in the illustrated embodiment, several expandable rivets 13 are preferably used as the first connectors. Other appropriate connectors include, for example, bolts or pins. As illustrated in FIG. 4, the expandable rivets 13 are preferably wedged into the pad openings 11. The rivets 13 are illustrated in more detail in FIG. 14. The rivets 13 include a head 15, a body 17, and a neck 19 between the body 17 and head 15. The neck 19 is preferably narrower than the body 17 and head 15. The body 17 should have a length coinciding with the thickness of the brake shoe plate 1. The rivet also includes an expansion section 37 at an end opposite from the head 15, and a pad section 21 between the body 17 and the expansion section 37. The expansion section 37 can be expanded after the rivet 13 is inserted into the pad opening 11. The pad section 21 should have a length coinciding with the thickness of the brake shoe pad 3.

Figure 2:
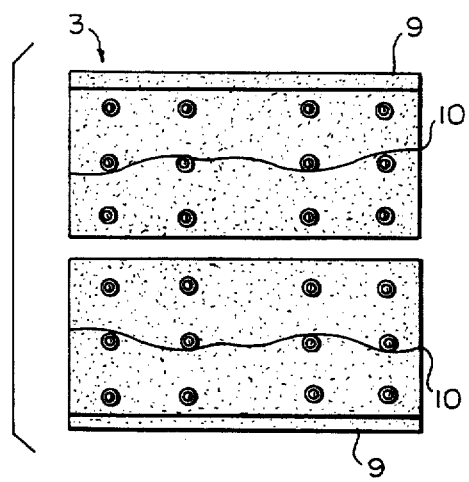
FIG. 2 is a top view of a brake shoe plate.

FIG. 2 also illustrates a split pad design, in which the contact pad 9 includes a slit 10. The slit 10 permits the contact pad 9 to be separated into two pieces. This allows replacement of pads in any close fitting areas where space may be a problem, such as on the P.D.K. brake system. The slit advantageously has uneven edges, as illustrated, to prevent wearing of the hub.

Figure 5:
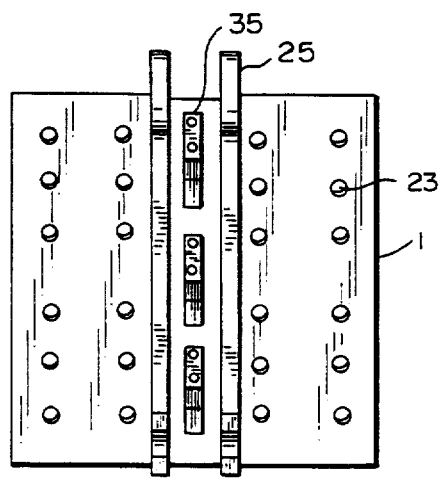
FIG. 5 is a top view of a brake shoe plate.
Figure 6:
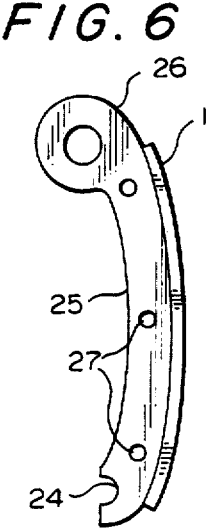
FIG. 6 is a side view of the brake shoe plate.

FIGS. 5 and 6 illustrate the brake shoe plate 1. The brake shoe plate 1 has a shape corresponding to the shape of the brake shoe pad 3. Thus, the brake shoe plate 1 has an arcuate shape (illustrated in FIG. 6). The brake shoe plate 1 includes connection receptors for receiving the first connectors, for connecting the brake shoe pad 3 to the brake shoe plate 1. In the illustrated embodiment, the connection receptors of the brake shoe plate 1 are several shoe openings 23 formed in the brake shoe plate 1.

As described above, the first connectors which are used to connect the brake shoe pad 3 to the brake shoe plate 1 should enable the brake shoe pad 3 to be quickly and easily removed from the brake shoe plate 1 and replaced, and additionally provide a sturdy connection therebetween. Thus, the illustrated embodiment shows the expandable rivets 13 used as the first connectors. The shoe openings 23 are formed in the brake shoe plate 1 with locations which will be correspondingly aligned with the locations of the pad openings 11, when the brake shoe pad 3 is connected to the brake shoe plate 1. Moreover, the shoe openings 23 advantageously have a size which is slightly larger than the rivet 13, to allow the rivet 13 to be snugly inserted therethrough.

The brake shoe plate 1 includes an assembly connector for use in connecting the brake shoe assembly to the brake of the vehicle. The assembly connector preferably has a shape which permits connection to the appropriate portions of the brake, dependent on the type of vehicle. In the example illustrated, the assembly connector includes a notch section 24 at one end, and a circular section 26 at the other end.

In the illustrated embodiment, the assembly connector is a pair of vertical plate members 25. Each vertical plate member 25 includes plate apertures 27, illustrated in FIG. 6, for receiving second connectors. The plate apertures 27 on each vertical plate member 25 are disposed to correspond to the plate apertures 27 on the other vertical plate member 25, such that the plate apertures 27 are in pairs.

The second connectors, which are used to connect the brake shoe plate 1 to the connector plates 5, should enable the connector plates 5 to be quickly and easily adjusted in order to receive the brake shoe pad 3 and rivets 13. Moreover, the second connectors should provide a sturdy connection between the brake shoe plate 1 and the connector plates 5.

Figure 7:
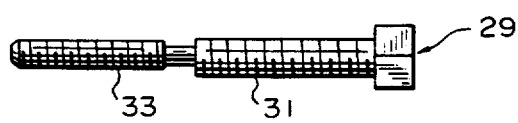
FIG. 7 is an elevation of a connector for use with a brake shoe assembly.

Thus, in the illustrated embodiment, several screws 29 are preferably used as the second connectors. So that the screws 29 will self-tighten, the screws 29 preferably include a right hand thread section 31 and a left hand thread section 33, illustrated in FIG. 7. As further illustrated in FIG. 10, the screws 29 are preferably inserted into the plate apertures 27.

Figure 15:
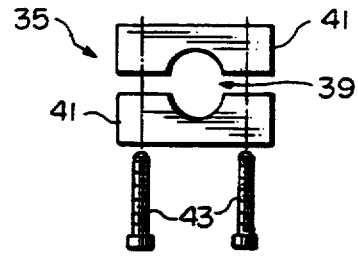
FIG. 15 is an exploded view of a stabilizer.

Moreover, to further provide improved sturdiness and stability, stabilizers 35 may be provided, preferably one for each screw 29, connected to the brake shoe plate between each pair of plate apertures 27. The stabilizers 35, illustrated in detail in FIG. 15, are preferably members connected to the brake shoe plate 1, with a stabilizer aperture 39 formed therein, through which the screw 29 may be inserted. The stabilizers 35 advantageously include a pair of halves 41, which are bolted by a pair of connectors 43 (pins in the illustrated embodiment) therethrough to the brake shoe plate 1. The screw 29, with both right and left hand threads 31, 33, is thus inserted through the plate apertures 27 of the vertical plate members 25 and the stabilizer aperture 39 of the stabilizer 35, to adjustably assemble the pair of connector plates 5 onto the brake shoe plate 1.

Reference is made to FIGS. 6 and 10. The connector plates 5 are advantageously adjustable side-to-side, with respect to the brake shoe plate 1. Additionally, the brake shoe pad 3 should be adjustable side-to-side, with respect to the brake shoe plate 1.

Figure 8:
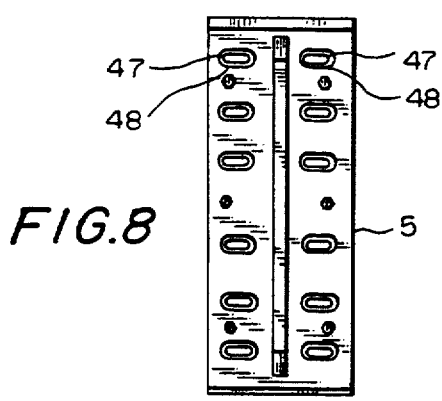
FIG. 8 is a top view of a connector plate.
Figure 9:
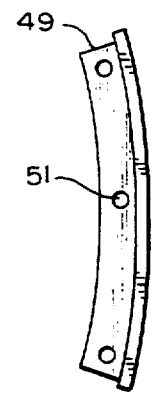
FIG. 9 is a side view of the connector plate.

Reference is made to FIGS. 8 and 9, illustrating one embodiment of the connector plate 5. The connector plate 5 has a shape corresponding to the shape of the brake shoe pad 3 and brake shoe plate 1. Thus, the connector plate 5 has an arcuate shape (illustrated in FIG. 9). The connector plate 5 includes connection receptors for receiving the first connectors connecting the brake shoe pad 3 to the brake shoe plate 1. In the illustrated embodiment, the connection receptors of the connector plates 5 are connector plate openings 47 formed in each connector plate 5. The connector plates 5 are preferably used in pairs, as illustrated.

As described above, the first connectors, which are used to connect the brake shoe pad 3 to the brake shoe plate 1 and the connector plates 5, should enable the brake shoe pad 3 to be quickly and easily removed from the brake shoe plate 1 and replaced, and additionally provide a sturdy connection therebetween. Thus, the illustrated embodiment shows the expandable rivets 13 used as the first connectors. The connector plate openings 47 are formed in the connector plates 5 with locations which correspond to the locations of the pad openings 11 and the shoe openings 23. Moreover, the connector plate openings 47 have a size and shape which self-tightens the rivet 13. In the illustrated embodiment, the shape of the connector plate openings 47 is approximately oval, and the connector plate openings 47 have a wall with a lift bevel 48 formed therein. The size of the connector plate openings is large enough to snugly insert the head 15 of the rivet 13.

To enable the connector plates 5 to be securely connected, the connector plates 5 are preferably connected to the brake shoe plate 1 by both the first and second connectors. Thus, the connector plates 5 are connected by rivets 13 as described above. Additionally, each connector plate 5 may include a vertical connector member 49. The vertical connector member 49 includes connector apertures 51, illustrated in FIG. 9, for receiving the second connectors. The connector apertures 51 on each vertical connector member 49 are disposed so as to correspond to the plate apertures 27 on the vertical plate members 25, when the connector plates 5 are assembled together with the brake shoe plate 1. Therefore, the second connectors provide a sturdy connection between the connector plates 5 and the brake shoe plate 1.

In the embodiment illustrated, the pad openings 11, shoe openings 23, and connector plate openings 47 are disposed in linear rows, a pair of rows being on one side of the vertical plate member 25 (see FIG. 10). When the brake shoe pad 3, brake shoe plate 1, and connector plates 5 are assembled, the rivets are thus placed through the corresponding openings 11, 23, 47 in the brake shoe pad 3, the brake shoe plate 1, and the connector plates 5. In this way, the connector plates 5 have two rows of openings 47, one on each side of the vertical connector member 49, to make a sturdy connection to the brake shoe plate 1, with less slippage. Also, the brake shoe plate 1 and brake shoe pad 3 have a row of openings 23, 11, on each side of the vertical plate member 25, which also makes a sturdy connection with less slippage. Preferably, each row includes six openings 23, 11, 47.

A description of assembling the brake shoe assembly follows, with reference to FIG. 10. For purposes of this description, it will be assumed that a brake shoe assembly, which needs replacement of pads, has been removed from the brake in the vehicle. A disassembled brake shoe assembly according to one embodiment of the invention includes the brake shoe pad 3, the brake shoe plate 1, the connector plates 5, and screws 29. It can be assumed that the elements within each of the above are secured together.

The brake shoe plate 1 is attached to the brake (not illustrated). The brake shoe assembly is assembled together by inserting the rivets 13 of the brake shoe pad 3 through the bottom of the brake shoe plate 1. The rivets 13 are inserted through the pad openings and shoe openings 11, 23. The two connector plates 5 are slidably adjusted onto the top of the brake shoe plate 1. One connector plate 5 is on each side of the brake shoe plate. As the connector plates 5 are positioned, the rivets 13 are inserted through the connector plate openings 47. Each screw 29 is inserted through corresponding apertures: through one connector aperture 51, one plate apertures 27, the stabilizer aperture 39, the other connector aperture 51, and the other connector aperture 51. Preferably, three screws 29 are used.

Removal of the brake shoe assembly from a brake is as follows: The screws 29 are turned and loosened. The connector plates 5 are slidably adjusted to release rivets 13, so that the brake shoe pad assembly 3 can be removed from the brake shoe plate 1. The brake shoe pad 3 can then be easily replaced with a new brake shoe pad 3 by reversing the steps given above, without requiring removal of the wheel.

Figure 13:
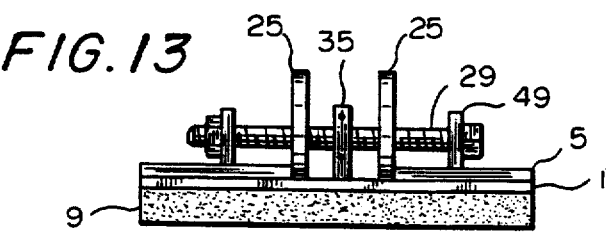
FIG. 13 is an end view of the brake shoe assembly.
Figure 11:
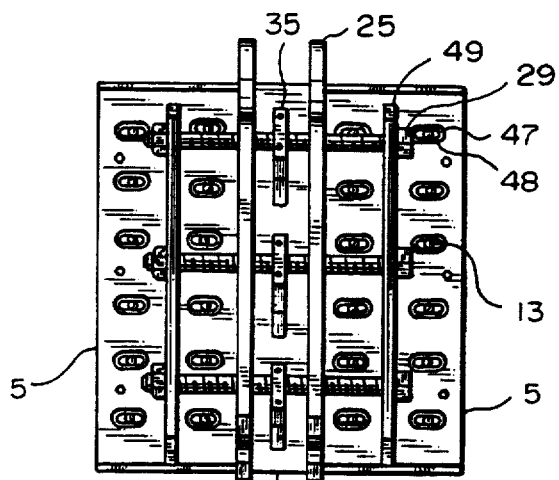
FIG. 11 is a top view of the brake shoe assembly.
Figure 12:
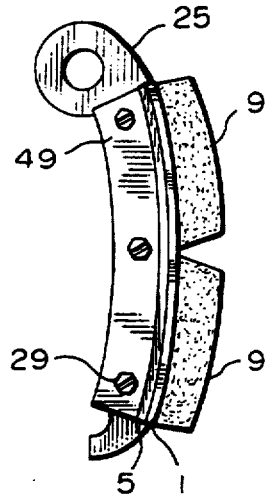
FIG. 12 is a side view of the brake shoe assembly.

FIGS. 11, 12 and 13 illustrate a fully assembled brake shoe assembly, as seen from the top, side and end, respectively. The multiple first connections between the brake shoe pad 3 and the brake shoe plate 1 provide greater sturdiness, as do the multiple second connections between the brake shoe plate 1 and the connector plates 5. Moreover, the beveled connector plate opening 47 tends to lift the head 15 of the rivet 13 as the rivet moves, thus making the brake shoe pad 3 self-tighten onto the connector plate 5 and brake shoe plate 1. Thus, the illustrated brake shoe assembly has other advantages in addition to providing an easily replaceable brake shoe pad.

While specific embodiments of the invention have been described and illustrated, it will be clear that variations in the details of the embodiments specifically illustrated and described may be made without departing from the true spirit and scope of the invention as defined in the appended claims.

What is claimed is:

1. A brake shoe assembly comprising:
   (a) a brake shoe plate, with a rigidly attached vertical plate member, and a plurality of plate apertures formed in the vertical plate member;
   (b) a brake shoe pad, with a plurality of connection receptors formed therein;
   (c) at least one connector plate, a plurality of connector plate openings being formed in the at least one connector plate, said connector plate including a vertical connector member, said vertical connector member having a plurality of connector apertures formed therein corresponding to the plate apertures, the connector plate openings being elongated transverse to said vertical connector member;
   (d) at least one first connector removably received in one of the connection receptors and one of the connector plate openings, wherein the first connector is directly rigidly connected to the connector plate; and
   (e) a plurality of second connectors, each removably received in the corresponding plate aperture and connector aperture, wherein the at least one connector plate is adjustable side-to-side on the brake shoe plate and removable therefrom.

2. The brake shoe assembly as claimed in claim 1, wherein:
   (a) the brake shoe plate includes a plurality of shoe openings formed therein;
   (b) the connection receptors are a plurality of pad openings formed in the brake shoe pad corresponding to the shoe openings;
   (c) the connector plate openings correspond to the shoe openings; and
   (d) each of the plurality of first connectors is removably received in the corresponding shoe opening, pad opening, and connector plate opening.

3. The brake shoe as claimed in claim 2, wherein the brake shoe pad includes at least one contact pad.

4. The brake shoe assembly as claimed in claim 2, wherein the contact pad includes a slit.

5. The brake shoe assembly as claimed in claim 4, wherein the brake shoe pad, connector plate, and brake shoe plate have an arcuate shape.

6. The brake shoe assembly as claimed in claim 2, wherein the first connectors are expandable rivets.

7. The brake shoe assembly as claimed in claim 1, further comprising an assembly connector.

8. The brake shoe assembly as claimed in claim 7, wherein the assembly connector includes a notch section at one end of the vertical plate members and a circular section at an other end thereof.

9. The brake shoe assembly as claimed in claim 8, wherein there are provided a pair of the vertical plate members, the plate apertures on each vertical plate member being disposed to correspond to the plate apertures on the other vertical plate member, such that the plate apertures are in pairs.

10. The brake shoe assembly as claimed in claim 9, the second connectors being screws.

11. The brake shoe assembly as claimed in claim 10, further comprising a stabilizer rigidly connected to the brake shoe plate between each pair of plate apertures, the stabilizer including a stabilizer aperture formed therein for inserting the screws.

12. The brake shoe assembly as claimed in claim 11, wherein the stabilizer includes a pair of halves connected together, forming a stabilizer aperture therebetween.

13. The brake shoe assembly as claimed in claim 12, wherein the connector plate opening has a shape which is approximately oval, and the connector plate opening has a wall with a lift bevel formed therein.

14. The brake shoe assembly as claimed in claim 13, the pad openings, the shoe openings, and the connector plate openings being disposed in linear rows.

15. The brake shoe assembly as claimed in claim 10, wherein the screws have a right-hand thread section and a left-hand thread section.

16. The brake shoe assembly as claimed in claim 11, including a pair of connector plates, the connector plates disposed outside the pair of vertical plate members and wherein the vertical plate member, the vertical connector member, and the stabilizer are spaced apart, and are urged together by the screws.

17. A method of replacing a brake shoe pad, comprising the steps of:
   (a) providing a brake shoe plate;
   (b) positioning and connecting a brake shoe pad onto the bottom of the brake shoe plate;
   (c) positioning two connector plates onto the top of the brake shoe plate, one connector plate on each side of the brake shoe plate, wherein a plurality of connector plate openings are formed in the connector plates, said connector plates include a vertical connector member, the connector plate openings being elongated transverse to said vertical connector member;
   (d) removably connecting the connector plates to the brake shoe pad by connection receptors formed in the brake shoe pad; and
   (e) removably connecting the connector plates to the brake shoe plate through the connector plate openings, and adjusting the connector plates side-to-side along the connector plate openings by connecting and urging the vertical connector members together.

18. A method as claimed in claim 17, wherein the connector plates are removably connected to the brake shoe pad through the brake shoe plate.

19. A method as claimed in claim 18, wherein the brake shoe plate has shoe openings formed therein corresponding to the connector plate openings, and the brake shoe pad has pad openings formed therein corresponding to the shoe openings, the connecting step (d) including inserting rivets through the corresponding connector plate openings, shoe openings and pad openings.

20. A method as claimed in claim 19, wherein the vertical connector member includes connector apertures formed therein, and the brake shoe plate includes a pair of rigidly attached vertical plate members with plate apertures formed therein corresponding to the connector apertures, the connecting step (e) including inserting screws through the corresponding connector apertures and plate apertures.

21. A method as claimed in claim 20, wherein the connector plate includes a stabilizer with a stabilizer aperture formed therein, corresponding to the plate apertures and connector apertures, the connecting step (e) further comprising inserting the screws through the stabilizer apertures.

22. A method as claimed in claim 21, further comprising the step of removing the brake shoe pad from the brake shoe plate.

* * * * *